(12) United States Patent  
Zerhusen et al.

(10) Patent No.: US 7,789,187 B2
(45) Date of Patent: *Sep. 7, 2010

(54) PUSH HANDLE WITH PIVOTABLE HANDLE POST

(75) Inventors: Robert M. Zerhusen, Cincinnati, OH (US); Steven V. McCaig, Batesville, IN (US)

(73) Assignee: Hill-Rom Services, Inc., Wilmington, DE (US)

( * ) Notice: Subject to any disclaimer, the term of this patent is extended or adjusted under 35 U.S.C. 154(b) by 134 days.

This patent is subject to a terminal disclaimer.

(21) Appl. No.: 12/021,347

(22) Filed: Jan. 29, 2008

(65) Prior Publication Data

US 2009/0188731 A1  Jul. 30, 2009

(51) Int. Cl.
B62D 51/04 (2006.01)

(52) U.S. Cl. .................. 180/323; 180/19.1; 5/600; 5/620

(58) Field of Classification Search ............ 180/19.1, 180/19.3, 321, 323, 326, 332, 334; 5/600, 5/620

See application file for complete search history.

(56) References Cited

U.S. PATENT DOCUMENTS

| 813,213 | A | 2/1906 | Johnson |
|---|---|---|---|
| 1,110,838 | A | 9/1914 | Taylor |
| 1,118,931 | A | 12/1914 | Hasley |
| 1,598,124 | A | 8/1926 | Evans |
| 1,639,801 | A | 8/1927 | Heise |
| 1,778,698 | A | 10/1930 | Walter |
| 2,224,087 | A | 12/1940 | Reichert |
| 2,599,717 | A | 6/1952 | Menzies |
| 2,635,899 | A | 4/1953 | Osbon, Jr. |
| 2,999,555 | A | 9/1961 | Stroud et al. |
| 3,004,768 | A | 10/1961 | Klages |
| 3,112,001 | A | 11/1963 | Wise |
| 3,304,116 | A | 2/1967 | Stryker |
| 3,305,876 | A | 2/1967 | Hutt |
| 3,380,546 | A | 4/1968 | Rabjohn |
| 3,393,004 | A | 7/1968 | Williams |
| 3,404,746 | A | 10/1968 | Slay |

(Continued)

FOREIGN PATENT DOCUMENTS

| CA | 2010543 | 9/1990 |
|---|---|---|
| CA | 2294761 | 1/1999 |
| CA | 2589811 | 6/2006 |
| DE | 1 041 210 | 10/1958 |
| DE | 94 20 429 | 12/1994 |
| DE | 295 18 502 U1 | 1/1997 |
| DE | 199 21 503 | 4/2000 |
| EP | 0 062 180 A2 | 10/1982 |
| EP | 0 093 700 A2 | 11/1983 |
| EP | 0 329 504 B1 | 8/1989 |

(Continued)

OTHER PUBLICATIONS

Stryker Medical, 2040 Zoom™ Critical Care Bed Maintenance Manual, date unknown.

(Continued)

Primary Examiner—Lesley D Morris
Assistant Examiner—Wesley Potter
(74) Attorney, Agent, or Firm—Barnes & Thornburg LLP

(57) ABSTRACT

A patient support apparatus comprises a frame, a patient support coupled to the frame, a push handle coupled to the frame and having a handle post, and at least one user input coupled to the handle post. The handle post is movable between a first position presenting the at least one user input to a caregiver standing at an end of the frame and a second position presenting the at least one user input to a caregiver standing alongside the frame.

20 Claims, 11 Drawing Sheets

U.S. PATENT DOCUMENTS

| | | | |
|---|---|---|---|
| 3,452,371 A | 7/1969 | Hirsch | |
| 3,544,127 A | 12/1970 | Dobson | |
| 3,618,966 A | 11/1971 | Vandervest | |
| 3,680,880 A | 8/1972 | Blaauw | |
| 3,770,070 A | 11/1973 | Smith | |
| 3,802,524 A | 4/1974 | Seidel | |
| 3,814,199 A | 6/1974 | Jones | |
| 3,820,838 A | 6/1974 | Limpach | |
| 3,869,011 A | 3/1975 | Jensen | |
| 3,872,945 A | 3/1975 | Hickman et al. | |
| 3,876,024 A | 4/1975 | Shieman et al. | |
| 3,938,608 A | 2/1976 | Folco-Zambelli | |
| 4,137,984 A | 2/1979 | Jennings et al. | |
| 4,164,355 A | 8/1979 | Eaton et al. | |
| 4,167,221 A | 9/1979 | Edmonson et al. | |
| 4,175,632 A | 11/1979 | Lassanske | |
| 4,175,783 A | 11/1979 | Pioth | |
| 4,221,273 A | 9/1980 | Finden | |
| 4,274,503 A | 6/1981 | Mackintosh | |
| 4,275,797 A | 6/1981 | Johnson | |
| 4,336,858 A * | 6/1982 | Loyzim | 180/179 |
| 4,415,049 A | 11/1983 | Wereb | |
| 4,415,050 A | 11/1983 | Nishida et al. | |
| 4,439,879 A | 4/1984 | Werner | |
| 4,444,284 A | 4/1984 | Montemurro | |
| 4,475,611 A | 10/1984 | Fisher | |
| 4,475,613 A | 10/1984 | Walker | |
| 4,511,825 A | 4/1985 | Klimo | |
| 4,513,832 A | 4/1985 | Engman | |
| 4,566,707 A | 1/1986 | Nitzberg | |
| 4,584,989 A | 4/1986 | Stith | |
| 4,614,246 A | 9/1986 | Masse et al. | |
| 4,629,242 A | 12/1986 | Schrager | |
| 4,646,860 A | 3/1987 | Owens et al. | |
| 4,723,808 A | 2/1988 | Hines | |
| 4,724,555 A | 2/1988 | Poehner et al. | |
| 4,759,418 A | 7/1988 | Goldenfeld et al. | |
| 4,771,840 A | 9/1988 | Keller | |
| 4,807,716 A | 2/1989 | Hawkins | |
| 4,811,988 A | 3/1989 | Immel | |
| 4,848,504 A | 7/1989 | Olson | |
| 4,874,055 A | 10/1989 | Beer | |
| 4,895,040 A | 1/1990 | Soederberg | |
| 4,922,574 A | 5/1990 | Heiligenthal et al. | |
| 4,938,493 A | 7/1990 | Okuda | |
| 4,949,408 A | 8/1990 | Trkla | |
| 4,979,582 A | 12/1990 | Forster | |
| 4,981,309 A | 1/1991 | Froeschle et al. | |
| 5,060,327 A | 10/1991 | Celestina et al. | |
| 5,060,959 A | 10/1991 | Davis et al. | |
| 5,069,465 A | 12/1991 | Stryker et al. | |
| 5,083,625 A | 1/1992 | Bleicher | |
| 5,084,922 A | 2/1992 | Louit | |
| 5,094,314 A | 3/1992 | Hayata | |
| 5,117,521 A | 6/1992 | Foster et al. | |
| 5,121,806 A | 6/1992 | Johnson | |
| 5,156,226 A | 10/1992 | Boyer et al. | |
| 5,181,762 A | 1/1993 | Beumer | |
| 5,187,824 A | 2/1993 | Stryker | |
| 5,193,633 A | 3/1993 | Ezenwa | |
| 5,201,819 A | 4/1993 | Shiraishi et al. | |
| 5,222,567 A | 6/1993 | Broadhead et al. | |
| 5,232,065 A | 8/1993 | Cotton | |
| 5,244,225 A | 9/1993 | Frycek | |
| 5,251,429 A | 10/1993 | Minato et al. | |
| 5,255,403 A | 10/1993 | Ortiz | |
| 5,279,010 A | 1/1994 | Ferrand et al. | |
| 5,284,218 A | 2/1994 | Rusher, Jr. | |
| 5,293,950 A | 3/1994 | Marliac | |
| 5,307,889 A | 5/1994 | Bohannan | |
| 5,322,306 A | 6/1994 | Coleman | |
| 5,337,845 A * | 8/1994 | Foster et al. | 180/11 |
| 5,348,326 A | 9/1994 | Fullenkamp et al. | |
| 5,358,265 A | 10/1994 | Yaple | |
| 5,366,036 A | 11/1994 | Perry | |
| 5,381,572 A | 1/1995 | Park | |
| 5,388,294 A | 2/1995 | Reeder | |
| 5,406,778 A | 4/1995 | Lamb et al. | |
| 5,439,069 A | 8/1995 | Beeler | |
| 5,445,233 A | 8/1995 | Fernie et al. | |
| 5,447,317 A | 9/1995 | Gehlsen et al. | |
| 5,447,935 A | 9/1995 | Hubele et al. | |
| 5,450,639 A | 9/1995 | Weismiller et al. | |
| 5,477,935 A | 12/1995 | Chen | |
| 5,495,904 A | 3/1996 | Zwaan et al. | |
| 5,526,890 A | 6/1996 | Kadowaki | |
| 5,531,030 A | 7/1996 | Dale, Jr. | |
| 5,535,465 A | 7/1996 | Hannant | |
| 5,542,138 A * | 8/1996 | Williams et al. | 5/658 |
| 5,542,690 A | 8/1996 | Kozicki | |
| 5,562,091 A | 10/1996 | Foster et al. | |
| 5,570,483 A | 11/1996 | Williamson | |
| 5,580,207 A | 12/1996 | Kiebooms et al. | |
| 5,613,252 A | 3/1997 | Yu et al. | |
| 5,669,086 A | 9/1997 | Garman | |
| 5,687,437 A | 11/1997 | Goldsmith | |
| 5,690,185 A | 11/1997 | Sengel | |
| 5,697,623 A | 12/1997 | Bermes et al. | |
| 5,737,782 A | 4/1998 | Matsuura et al. | |
| 5,749,424 A | 5/1998 | Reimers | |
| 5,775,456 A | 7/1998 | Reppas | |
| 5,778,996 A | 7/1998 | Prior et al. | |
| 5,806,111 A * | 9/1998 | Heimbrock et al. | 5/86.1 |
| 5,809,755 A | 9/1998 | Velke et al. | |
| 5,810,104 A * | 9/1998 | Campbell | 180/19.3 |
| 5,826,670 A | 10/1998 | Nan | |
| 5,839,528 A | 11/1998 | Lee | |
| 5,890,562 A * | 4/1999 | Bartels et al. | 187/224 |
| 5,906,017 A | 5/1999 | Ferrand et al. | |
| 5,915,487 A | 6/1999 | Splittstoesser et al. | |
| 5,921,338 A | 7/1999 | Edmondson | |
| 5,927,414 A | 7/1999 | Kan et al. | |
| 5,934,694 A | 8/1999 | Schugt et al. | |
| 5,937,959 A | 8/1999 | Fujii et al. | |
| 5,937,961 A | 8/1999 | Davidson | |
| 5,944,131 A | 8/1999 | Schaffner et al. | |
| 5,964,313 A * | 10/1999 | Guy | 180/332 |
| 5,964,473 A | 10/1999 | Degonda et al. | |
| 5,971,091 A | 10/1999 | Kamen et al. | |
| 5,983,425 A | 11/1999 | DiMucci et al. | |
| 5,987,671 A | 11/1999 | Heimbrock et al. | |
| 5,988,304 A | 11/1999 | Behrendts | |
| 5,996,149 A | 12/1999 | Heimbrock et al. | |
| 6,000,486 A | 12/1999 | Romick et al. | |
| 6,016,580 A | 1/2000 | Heimbrock et al. | |
| 6,035,561 A | 3/2000 | Paytas et al. | |
| 6,050,356 A | 4/2000 | Takeda et al. | |
| 6,059,060 A | 5/2000 | Kanno et al. | |
| 6,059,301 A | 5/2000 | Skarnulis | |
| 6,062,328 A | 5/2000 | Campbell et al. | |
| 6,065,555 A | 5/2000 | Yuki et al. | |
| 6,070,679 A | 6/2000 | Berg et al. | |
| 6,073,285 A | 6/2000 | Ambach et al. | |
| 6,076,208 A | 6/2000 | Heimbrock et al. | |
| 6,076,209 A | 6/2000 | Paul | |
| 6,098,732 A | 8/2000 | Romick et al. | |
| 6,105,348 A | 8/2000 | Turk et al. | |
| 6,125,957 A | 10/2000 | Kauffmann | |
| 6,131,690 A | 10/2000 | Galando et al. | |
| 6,148,942 A | 11/2000 | Mackert, Sr. | |
| 6,154,690 A | 11/2000 | Coleman | |
| 6,173,799 B1 | 1/2001 | Miyazaki et al. | |
| 6,178,575 B1 | 1/2001 | Harada | |
| 6,179,074 B1 | 1/2001 | Scharf | |

| | | | | | | |
|---|---|---|---|---|---|---|
| 6,209,670 | B1 | 4/2001 | Fernie et al. | JP | 53-9091 | 1/1978 |
| 6,256,812 | B1 | 7/2001 | Bartow et al. | JP | 53-96397 | 8/1978 |
| 6,286,165 | B1 | 9/2001 | Heimbrock et al. | JP | 56-68523 | 6/1981 |
| 6,330,926 | B1 | 12/2001 | Heimbrock et al. | JP | 56-68524 | 6/1981 |
| 6,343,665 | B1 | 2/2002 | Eberlein et al. | JP | 56-73822 | 6/1981 |
| 6,390,213 | B1 | 5/2002 | Bleicher | JP | 57-157325 | 10/1982 |
| 6,446,747 | B1 * | 9/2002 | Muller et al. ............... 180/334 | JP | 57-187521 | 11/1982 |
| 6,474,434 | B1 | 11/2002 | Bech | JP | 58 06357 | 4/1983 |
| 6,486,792 | B1 * | 11/2002 | Moster et al. .......... 340/825.19 | JP | 59-37946 | 3/1984 |
| 6,505,359 | B2 | 1/2003 | Heimbrock et al. | JP | 59-38176 | 3/1984 |
| 6,588,523 | B2 | 7/2003 | Heimbrock et al. | JP | 59-183756 | 10/1984 |
| 6,668,402 | B2 | 12/2003 | Heimbrock | JP | 59-186554 | 10/1984 |
| 6,668,965 | B2 | 12/2003 | Strong | JP | 60-12058 | 1/1985 |
| 6,725,956 | B1 | 4/2004 | Lemire | JP | 60-12059 | 1/1985 |
| 6,749,034 | B2 | 6/2004 | Vogel et al. | JP | 60-21751 | 2/1985 |
| 6,752,224 | B2 | 6/2004 | Hopper et al. | JP | 60-31749 | 2/1985 |
| 6,772,850 | B1 | 8/2004 | Waters et al. | JP | 60-31750 | 2/1985 |
| 6,877,572 | B2 | 4/2005 | Vogel et al. | JP | 60-31751 | 2/1985 |
| 6,879,863 | B2 * | 4/2005 | Mueller et al. ................ 700/85 | JP | 60-122561 | 7/1985 |
| 6,902,019 | B2 | 6/2005 | Heimbrock et al. | JP | 60-188152 | 9/1985 |
| 6,945,697 | B2 | 9/2005 | Schuster | JP | 60-188153 | 9/1985 |
| 7,007,765 | B2 | 3/2006 | Waters et al. | JP | 61 88727 | 8/1986 |
| 7,011,172 | B2 | 3/2006 | Heimbrock et al. | JP | 61-188727 | 11/1986 |
| 7,014,000 | B2 | 3/2006 | Kummer et al. | JP | 62-60433 | 4/1987 |
| 7,021,407 | B2 | 4/2006 | Ruschke et al. | JP | 64-17231 | 1/1989 |
| 7,083,012 | B2 | 8/2006 | Vogel et al. | JP | 2-84961 | 3/1990 |
| 7,090,041 | B2 | 8/2006 | Vogel et al. | JP | 03-031063 | 2/1991 |
| 7,195,253 | B2 * | 3/2007 | Vogel et al. ................. 280/19.1 | JP | 4-108525 | 9/1992 |
| 7,273,115 | B2 | 9/2007 | Kummer et al. | JP | 6-50631 | 7/1994 |
| 7,284,626 | B2 | 10/2007 | Heimbrock et al. | JP | 6-237959 | 8/1994 |
| 2002/0138905 | A1 | 10/2002 | Bartlett et al. | JP | 7-136215 | 5/1995 |
| 2002/0152555 | A1 | 10/2002 | Gallant et al. | JP | 7 328074 | 12/1995 |
| 2004/0133982 | A1 | 7/2004 | Horitani et al. | JP | 8-112244 | 5/1996 |
| 2005/0199430 | A1 * | 9/2005 | Vogel et al. ................... 180/15 | JP | 8-317953 | 12/1996 |
| 2006/0059623 | A1 | 3/2006 | Karmer, Jr. et al. | JP | 9-24071 | 1/1997 |
| 2006/0101581 | A1 * | 5/2006 | Blanchard et al. .............. 5/713 | JP | 9-38154 | 2/1997 |
| 2006/0113546 | A1 * | 6/2006 | Ackermann ................ 180/326 | JP | 9-38155 | 2/1997 |
| 2006/0179571 | A1 * | 8/2006 | Newkirk ......................... 5/600 | JP | 10-146364 | 6/1998 |
| 2006/0231301 | A1 * | 10/2006 | Rose et al. ................. 180/19.1 | JP | 10-181609 | 7/1998 |
| 2007/0163043 | A1 * | 7/2007 | Lemire et al. ................... 5/600 | JP | 10-305705 | 11/1998 |
| 2008/0086815 | A1 * | 4/2008 | Kappeler et al. ............... 5/600 | JP | 200-118407 | 4/2000 |
| 2008/0141459 | A1 * | 6/2008 | Hamberg et al. ............... 5/600 | JP | 2000-107230 | 4/2000 |
| 2008/0263769 | A1 * | 10/2008 | Newkirk et al. ............. 5/503.1 | JP | 2000-175974 | 6/2000 |

FOREIGN PATENT DOCUMENTS

| | | |
|---|---|---|
| EP | 0 352 647 B1 | 1/1990 |
| EP | 0 403 202 B1 | 12/1990 |
| EP | 0 420 263 A1 | 4/1991 |
| EP | 0 630 637 A1 | 12/1994 |
| EP | 0 653 341 A1 | 5/1995 |
| EP | 0 776 637 A1 | 6/1997 |
| EP | 0 776 648 A1 | 6/1997 |
| EP | 991529 B1 | 4/2000 |
| EP | 1 911 429 A2 | 4/2008 |
| FR | 2 714 008 | 6/1995 |
| FR | 2 735 019 | 12/1996 |
| FR | 2 746 060 | 9/1997 |
| GB | 415450 | 8/1934 |
| GB | 672557 | 5/1952 |
| GB | 1 601 930 | 11/1981 |
| GB | 2 285 393 A | 7/1995 |
| JP | 46-31490 | 9/1971 |
| JP | 47-814 | 8/1972 |
| JP | 47-17495 | 10/1972 |
| JP | 47-44792 | 6/1973 |
| JP | 48-44792 | 6/1973 |
| JP | 48-44793 | 6/1973 |
| JP | 48-54494 | 7/1973 |
| JP | 48-54495 | 7/1973 |
| JP | 49-29855 | 3/1974 |
| JP | 51-20491 | 2/1976 |
| WO | WO 82-01313 | 4/1982 |
| WO | WO 87/07830 | 12/1987 |
| WO | WO 94/16935 | 8/1994 |
| WO | WO 94/21505 | 9/1994 |
| WO | WO 95/20514 | 8/1995 |
| WO | WO 96/07555 | 3/1996 |
| WO | WO 96/33900 | 10/1996 |
| WO | WO 97/39715 | 10/1997 |
| WO | WO 99/01298 | 1/1999 |
| WO | WO 00/37222 | 6/2000 |
| WO | WO 00/51830 | 8/2000 |
| WO | WO 01/19313 | 3/2001 |
| WO | WO 01/85084 | 11/2001 |
| WO | WO 2005/028243 | 3/2005 |
| WO | WO 2005/068276 A1 | 7/2005 |
| WO | WO 2006/059200 A2 | 6/2006 |
| WO | WO 2007/121376 A2 | 10/2007 |

OTHER PUBLICATIONS

Motorvator 3 Product Features Webpage, May 10, 2000.
Stryker Corporation Zoom™ drive brochure, Mar. 2000.
Midmark 530 Stretcher Information, Midmark Catalog, p. 14.
Tri-Flex II by Burke, Inc., "Operation Manual Impulse Drive System," (2004).
Supplementary European Search Report dated Mar. 30, 2010 (5 pages).

* cited by examiner

PUSH HANDLE WITH PIVOTABLE HANDLE POST

BACKGROUND

The present disclosure relates to patient support apparatuses, such as hospital beds or stretchers, and particularly to patient support apparatuses having powered transport devices such as motorized wheels or motorized traction drives to propel the patient support apparatus along a floor. More particularly, the present disclosure relates to user interfaces and control systems for such transport devices.

Some patient support apparatuses, such as hospital beds or stretchers, have powered transport systems that propel the patient support apparatus along a floor. See, for example, U.S. Pat. Nos. 7,090,041; 7,083,012; 7,021,407; 7,011,172; 7,007,765; 6,902,019; 6,877,572; 6,772,850; 6,752,224; 6,749,034; 6,725,956; 6,588,523; 6,390,213; 6,330,926; and 5,083,625. It is common for such systems to have controllers that are programmed to sense a plurality of conditions before a motor will be activated to propel the patient support apparatus along a floor. For example, such systems usually sense whether or not casters are braked, whether or not an enable switch or other safety switch is engaged by a user, whether or not a battery has sufficient power to activate the motor, and whether or not an AC power plug of the patient support apparatus is plugged into an electrical outlet. If the caster brakes are set, if the enable switch is not engaged, if the battery power is too low, or if the AC power plug is plugged in, the powered transport systems will typically be disabled from propelling the associated patient support apparatus.

Most of the known prior art transport devices of hospital beds and stretchers are configured to propel the bed only in forward and reverse directions. It has also been proposed to have a powered transport device that will allow the wheel or traction drive to be re-oriented relative to the patient support apparatus to allow for side-to-side or lateral transport in addition to forward and reverse transport. See, for example, U.S. patent application Ser. No. 11/865,763, filed Oct. 2, 2007, and entitled "USER INTERFACE AND CONTROL SYSTEM FOR POWERED TRANSPORT DEVICE OF A PATIENT SUPPORT APPARATUS," now published as U.S. Patent Application Publication No. 2008/0086815 A1, which is hereby incorporated by reference herein in its entirety. In such patient support apparatuses that have power transport systems that can propel forwardly, rearwardly, and side-to-side, it is advantageous to give a caregiver access to power transport system controls from the ends of the patient support apparatus, as well as the sides.

SUMMARY

The present invention comprises a patient support apparatus having one or more of the features recited in the appended claims and/or one or more of the following features, which alone or in any combination may comprise patentable subject matter:

A patient support apparatus may comprise a frame, a push handle coupled to the frame and having a handle post, and at least one user input coupled to the handle post. The handle post may be movable between a first position presenting the at least one user input to a caregiver standing at an end of the frame and a second position presenting the at least one user input to a caregiver standing alongside a side of the frame.

The first position of the handle post may be generally parallel to said end of the frame and the second position of the handle post may be generally parallel to said side of the frame.

The handle post may be rotatable between the first and second positions about an axis that extends generally at 45° to a longitudinal axis of the frame. The at least one user input may comprise a membrane switch.

The push handle may have a hollow tube that extends generally upwardly from the frame and the handle post may be coupled to the upwardly-extending hollow tube by a rotary joint or hinge. The hinge may be a 45° offset hinge.

The handle post may be formed to include a pair of parallel spaced-apart lugs or flanges. The hinge may comprise a fitting coupled to the hollow tube and having a flattened end which may be disposed between the spaced-apart flanges of the handle post. A pivot pin may extend through respective openings in the flanges of the handle post and the flattened portion of the fitting to pivotally couple the handle post to the hollow tube of the push handle. The pivot pin has an axis that may extend generally at 45° to a longitudinal axis of the frame.

The patient support apparatus may further comprise a power transport system coupled to the frame and operable to propel the patient support apparatus along a floor. The at least one user input may be engageable to provide a signal to the power transport system to propel the patient support apparatus along the floor. When the handle post is in the first position, the at least one user input may be assigned a first function. When the handle post is in the second position, at least one user input may be assigned a second function.

The power transport system may be in a transport mode when the handle post is in the first position and the power transport system may be in an adjustment mode when the handle post is in the second position. A speed at which the power transport system propels the patient support apparatus may be higher in the transport mode than in the adjustment mode.

The patient support apparatus may further comprise an enable switch coupled to the handle post. The at least one user input and the enable switch may be engageable simultaneously to signal the power transport system to propel the patient support apparatus along the floor.

The patient support apparatus may further comprise a controller to control operation of the power transport system. The power transport system may have a wheel and an on-board battery. The controller may have to be signaled that the wheel is lowered to engage the floor and that the on-board battery is sufficiently charged before the power transport system propels the patient support apparatus.

The patient support apparatus may further comprise a handle post position indicative switch coupled to the controller. When the handle post is in the first position, the handle post position indicative switch may signal the controller to assign a first function to the at least one user input. When the handle post is in the second position, the handle post position indicative switch may signal the controller to assign a second function to the at least one user input. The handle post position indicative switch may be situated within an interior region of the push handle hinge. The handle post position indicative switch may be a cherry switch.

The wheel of the power transport system may be movable between a first orientation in which the power transport system is operable to propel the patient support apparatus substantially parallel to a longitudinal dimension of the frame and a second orientation in which the power transport system is operable to propel the patient support apparatus substantially parallel to a lateral dimension of the frame.

The push handle may be pushed forwardly and pulled rearwardly to signal the power transport system to propel the patient support apparatus forwardly and rearwardly, respectively. The at least one user input may comprise a speed selection button that is engageable to select a speed at which the power transport system propels the patient support apparatus. The at least one user input may comprise left and right switches that are engageable to signal the power transport system to propel the patient support apparatus leftwardly and rightwardly, respectively.

Additional features, which alone or in combination with any other feature(s), such as those listed above, may comprise patentable subject matter and will become apparent to those skilled in the art upon consideration of the following detailed description of various embodiments exemplifying the best mode of carrying out the embodiments as presently perceived.

DETAILED DESCRIPTION OF THE DRAWINGS

Figure 1:
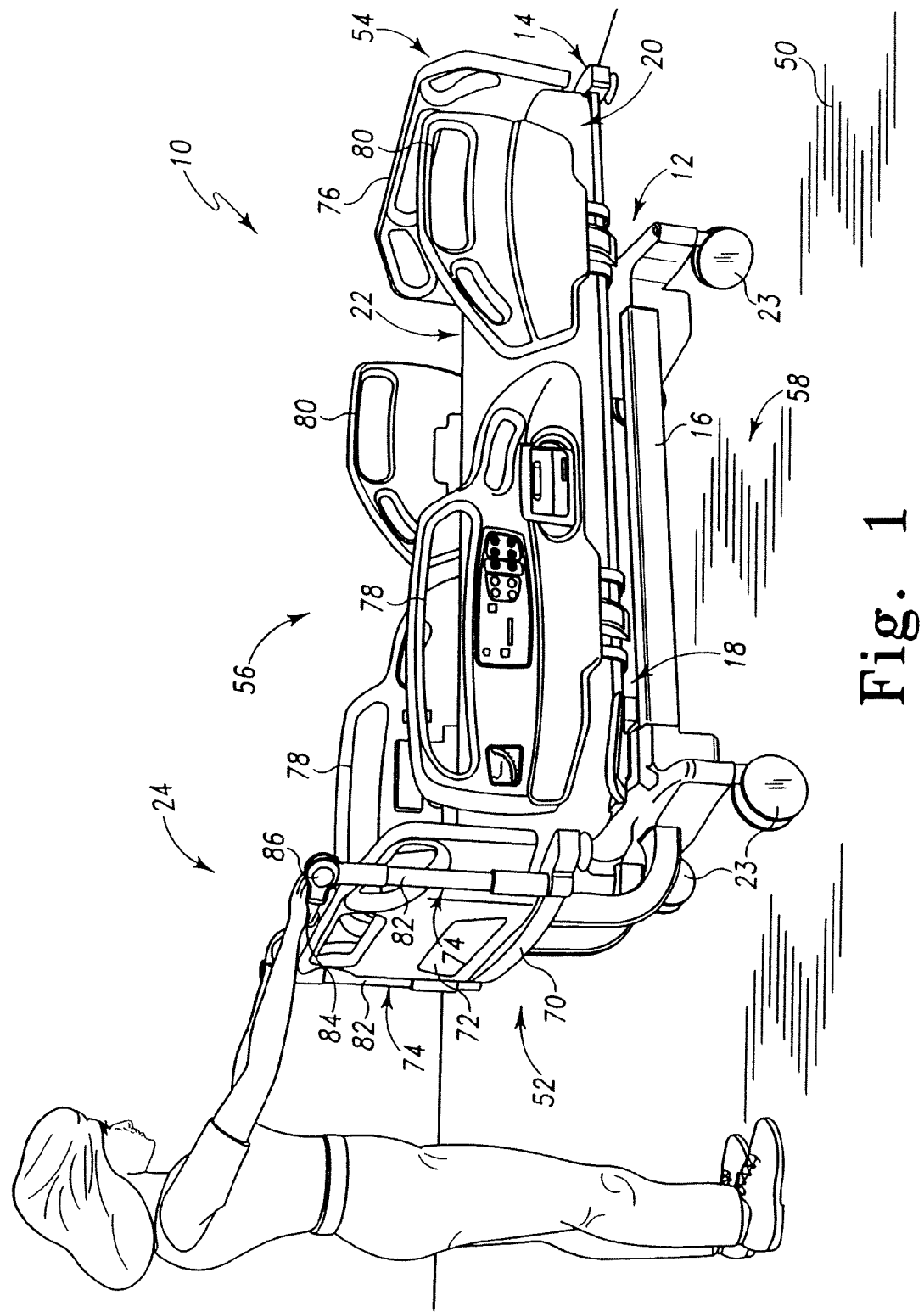
FIG. 1 is a side perspective view of a patient support apparatus showing a pair of push handles coupled to a head end of a frame and having handle posts, the frame supporting a mattress support deck, head and foot end siderails along left and right sides of the frame, a headboard coupled to the head end of the frame, a footboard coupled to the foot end of the frame, user interfaces of a power transport system of the patient support apparatus coupled to distal ends of the respective handle posts (as shown in FIG. 2), and showing a caregiver standing at the head end of the patient support apparatus with her hands on the handle posts so that she can operate the controls on one of the user interfaces with her thumb, the handle posts being movable between a first position presenting the user interfaces to a caregiver standing at the head end of the frame (as shown in FIG. 1) and a second position presenting the user interfaces to a caregiver standing alongside an associated side of the frame (as shown in FIG. 7 with respect to a right side handle post)
Figure 2:
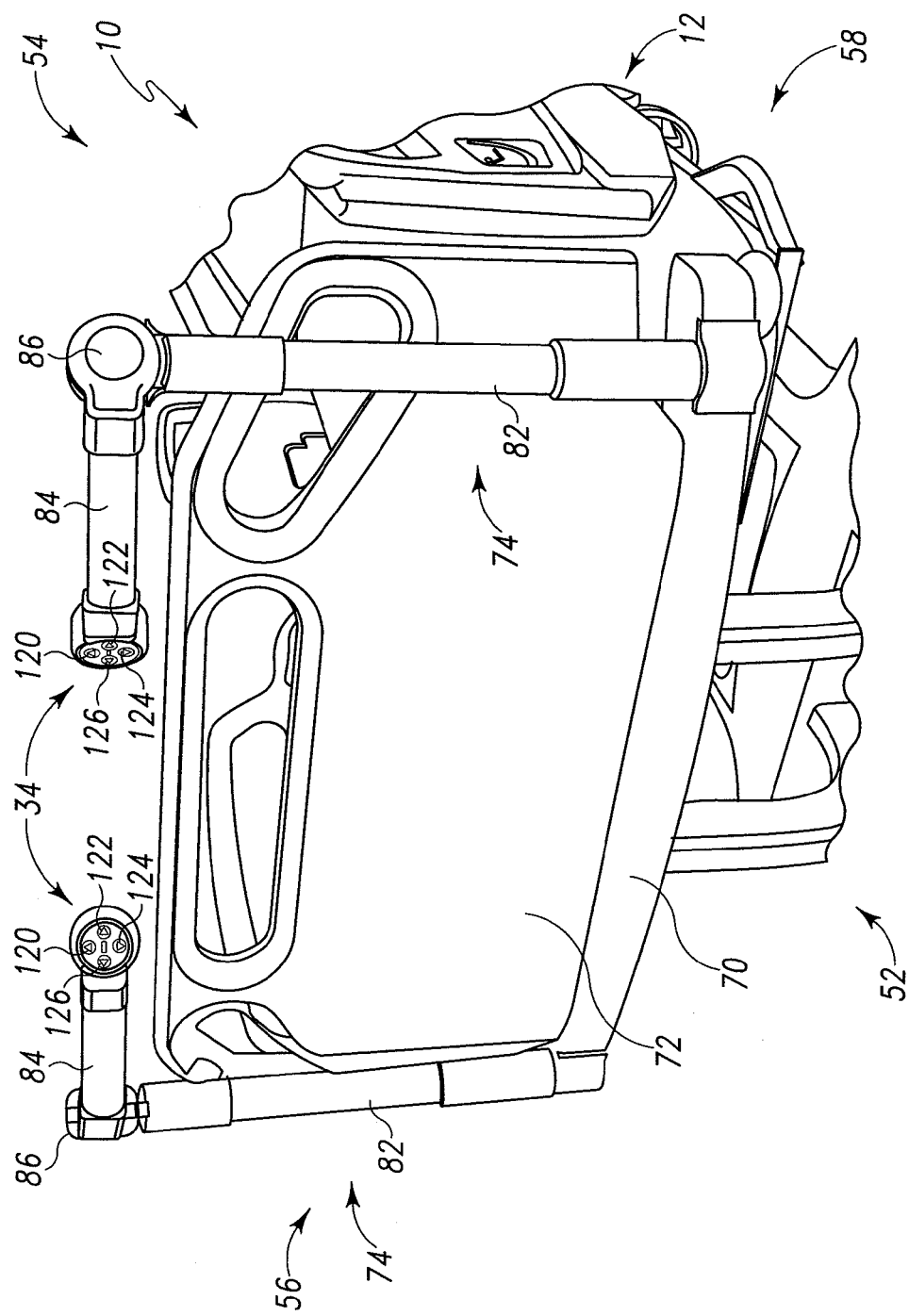
FIG. 2 is a front perspective view of the patient support apparatus showing the handle posts of the push handles in their respective first positions.

As shown in FIGS. 1-2, a patient support apparatus 10, such as the illustrative stretcher or a hospital bed, includes a frame 12 which has an upper frame 14 and a base or lower frame 16 interconnected by an elevation adjustment mechanism 18 that is operable to raise, lower, and tilt the upper frame 14 relative to the lower frame 16. A patient support 20, such an articulating deck, is coupled to the upper frame 14. A mattress 22 is carried by the patient support 20. A plurality of casters 23 are coupled to the base frame 16 and are in contact with the underlying floor 50. Casters 23 include braking mechanisms (not shown) which are well known in the art and the apparatus 10 has a set of brake/steer pedals (not shown) which are movable to brake and unbrake the casters 23 via manipulation of the associated caster braking mechanisms.

Figure 6:
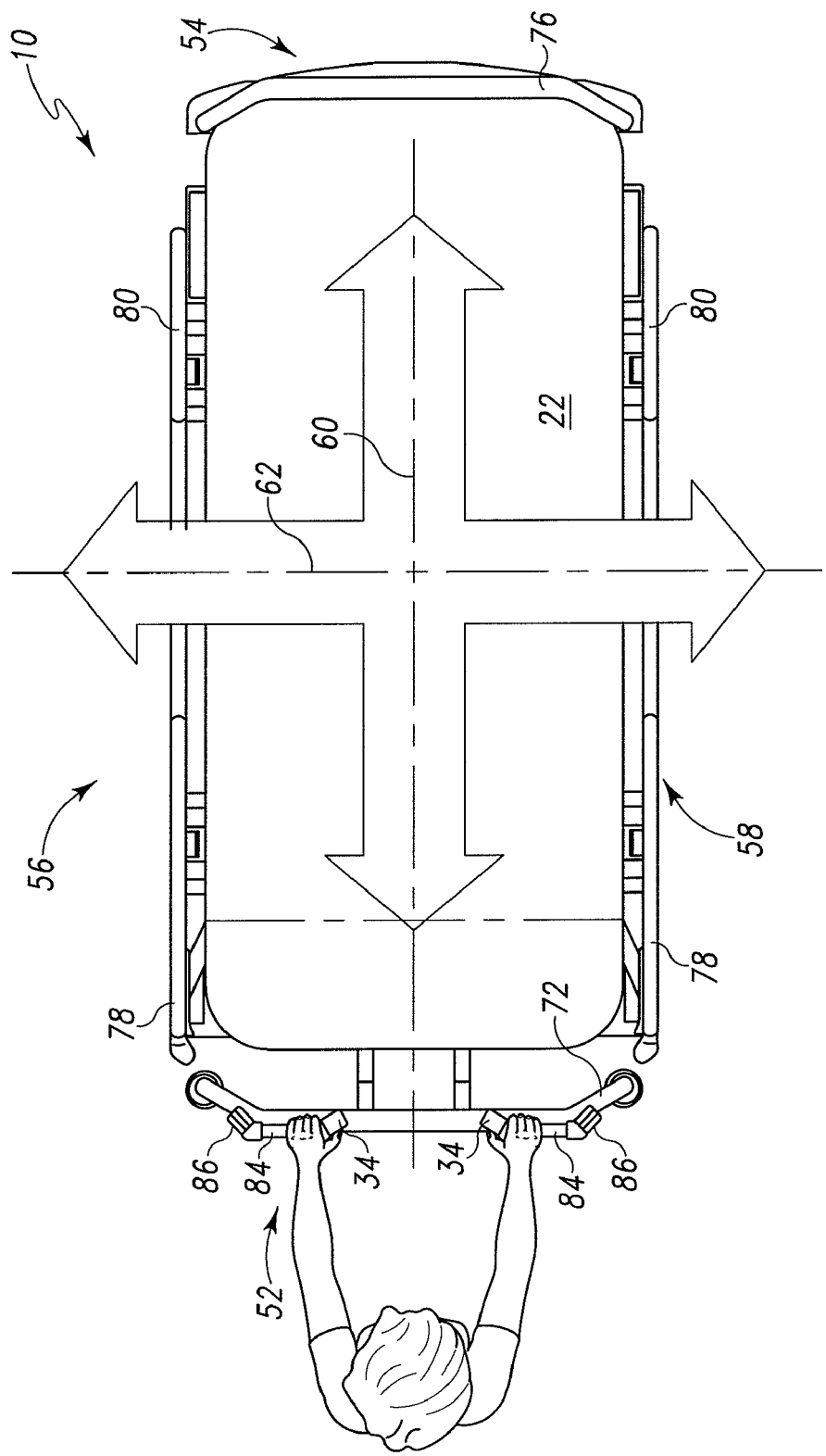
FIG. 6 is a plan view of the patient support apparatus showing the handle posts in their respective first positions and a caregiver standing at the head end of the patient support apparatus with her hands on the handle posts so that she can operate the controls on one of the user interfaces with her thumb.

As shown in FIG. 6, the apparatus 10 has a head end 52, a foot end 54, a left side 56, a right side 58, a longitudinal axis 60, and a transverse or lateral axis 62. In the illustrative embodiment, a headboard mounting frame 70 is located on the base frame 16 near the head end 52 and is configured to support a headboard 72 and a pair of push handles 74. A footboard 76 is located near the foot end 54 of the frame 12.

Head and foot end siderails 78, 80 are provided on the left and right sides 56, 58 of the frame 12.

As used in the specification and claims, the left and right directions are determined from the vantage point of a user standing adjacent a head end 52 of the apparatus 10 and facing toward the apparatus 10 (as shown in FIG. 1) or from the vantage point of a patient lying in a supine or face up position on the mattress 22 with his head near the headboard 52 of the apparatus 10. Also, as used in the specification and claims, the forward direction means having the foot end 54 of the apparatus 10 leading the way and the reverse or rearward direction means having the head end 52 of the apparatus 10 leading the way. Further, as used in the specification and claims, the phrases "head end 52," "foot end 54," "left side 56" and "right side 58" will be used to denote the end of any referred-to object that is positioned to lie nearest the head end 52, foot end 54, left side 56 and right side 58 of the apparatus 10, respectively.

A powered transport system 24 is coupled to the base frame 16 and includes a wheel 26 (shown schematically in FIG. 3) that is motor driven to propel the apparatus 10 along a floor. In one embodiment, the system 24 is of the type available from Borringia Industrie AG of Ettingen, Switzerland, one version of which is marketed as the COMPASS™ drive. Such a system 24, therefore, may be constructed in accordance with the teachings of PCT Patent Application No. PCT Publication No. WO 2006/059200 A2, which is hereby incorporated by reference herein and which has a motor driven wheel that can be raised out of contract with the floor, lowered into contact with the floor, and swiveled by ninety degrees between a first orientation in which the apparatus 10 is propelled in the longitudinal direction 60 (i.e., parallel with the longitudinal or long dimension 60 of the frame 12) and a second orientation in which apparatus 10 is propelled side-to-side or in the lateral direction 62 (i.e., parallel with the lateral or short dimension 62 of the frame 12).

Figure 3:
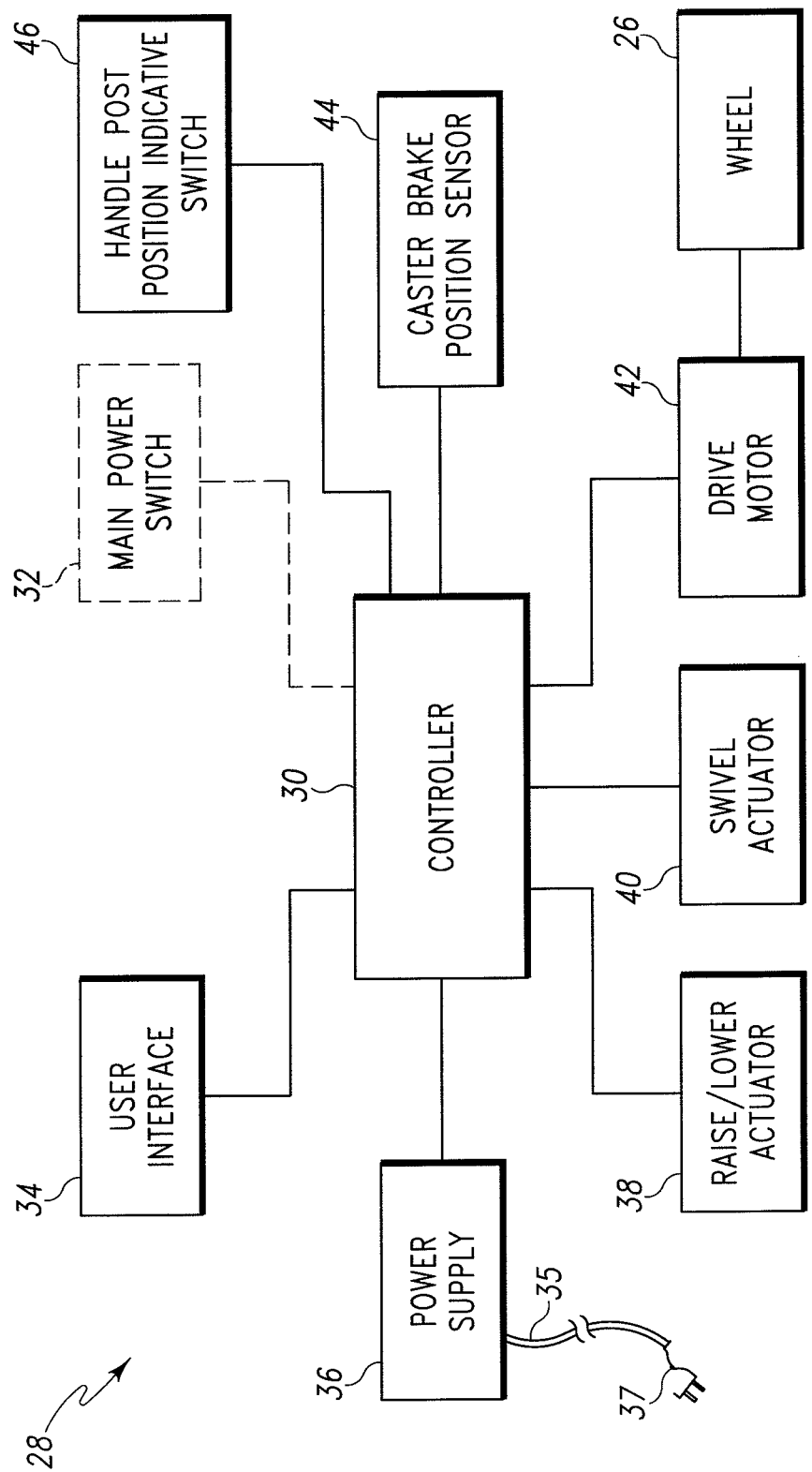
FIG. 3 is a block diagram of an electrical system of the power transport system showing a controller, an optional main power switch, user interfaces, a power supply, a raise/lower actuator, a swivel actuator, a drive motor coupled to a wheel, a caster brake position sensor, and a handle post position indicative switch, each coupled to the controller.

As shown in FIG. 3, an electrical system 28 of the transport system 24 includes a controller 30, an optional main power switch 32, user interfaces 34, a power supply 36, a raise/lower actuator 38, a swivel actuator 40, a drive motor 42 coupled to the wheel 26, a caster brake position sensor 44, and a handle post position indicative switch 46, each of which is coupled to the controller 30. Controller 30 comprises logic-based circuitry such as a microprocessor, a microcontroller, a field programmable gate array, or even discrete logic gates or the like, along with all associated circuitry such as memory, analog-to-digital converters, digital-to-analog converters, input/output circuitry and so on. The circuitry of the controller 30 may be located on a plurality of circuit boards or be included in various modules that couple together. For example, the controller 30 may include a logic controller portion which receives input signals regarding various conditions of the apparatus 10 and a drive controller portion that is coupled to the logic controller portion and that controls voltage and/or current application to the motor 42 and the actuators 38, 40 of the electrical system 28 in response to an output signal received from the logic controller portion. In those embodiments having the main power switch 32, this switch 32 is used to turn the transport system 24 on and off. In those embodiments without the main power switch 32, then transport device may be on continually, although the electrical system 28 may power down into a sleep mode after a period of inactivity. In some embodiments, when off or when in the sleep mode, the transport system 24 has the wheel 26 in a raised position spaced from the underlying floor.

The user interfaces 34 include a plurality of user inputs or controls 100, as will be further described below, that are engaged by a user or caregiver to signal the controller 30 as to the manner in which transport system 24 is to be operated. Power supply 36 comprises a battery, battery recharging circuitry, an AC power cord 35 having an AC power plug 37, AC-to-DC conversion circuitry and other circuit components involved in powering the remainder of the system 28. Actuator 38 is operable in response to command signals from the controller 30 to raise the wheel 26 off of the underlying floor and to lower the wheel 26 into contact with the floor. Actuator 40 is operable in response to command signals from the controller 30 to swivel the wheel 26 between the first and second orientations. Drive motor 42 is operable in response to command signals from the controller 30 to rotate the wheel 26 thereby to propel the apparatus 10 along the floor.

Assuming the controller 30 receives signals from one of the user interface controls 100 indicating that a user desires powered transport of the apparatus 10, the controller 30 determines whether other conditions are met prior to activating the motor 42 to drive the wheel 26. For example, the controller 30 will first determine that battery power of the power supply 36 meets or exceeds a threshold level, will determine that the casters 23 are unbraked, and will also determine that at least one of the enable switches 102 on the handle posts 84 are engaged before applying power to the drive motor 42 to rotate the wheel 26. Caster brake position sensor 44 provides a signal to the controller regarding whether the casters 23 are braked or unbraked.

Contrary to the teachings of all known prior art patient support apparatuses that have powered transport systems and that have AC power plugs, the controller 30 does not require that the power plug of the power supply 36 of the apparatus 10 be unplugged prior to applying power to the drive motor 42 to rotate the wheel 26 to propel apparatus 10 along the floor. This creates the possibility that apparatus 10 can be power driven with the power plug still plugged into an electrical outlet resulting in the power plug being ripped out of the electrical outlet as the apparatus 10 is driven away. However, by allowing the motor 42 to be driven even when the AC power plug is plugged into an electrical outlet, the transport system 24 can be operated in an adjustment mode to make minor adjustments in the positioning of the apparatus 10 within its location. This is especially useful when obese or morbidly obese (also known as, bariatric) patients are supported on the apparatus 10. In addition to the adjustment mode, the apparatus 10 has a transport mode to transport a patient relatively long distances at relatively higher speeds, such as when a patient is transported from a patient room to an X-ray lab on another floor or in another wing of a hospital or healthcare facility.

In some embodiments, both push handles 74 and the both siderails 78 have user interfaces 34. See, for example, U.S. patent application Ser. No. 11/865,763, filed Oct. 2, 2007, and entitled "USER INTERFACE AND CONTROL SYSTEM FOR POWERED TRANSPORT DEVICE OF A PATIENT SUPPORT APPARATUS ," now published as U.S. Patent Application Publication No. 2008/0086815 A1. In the illustrative embodiment, however, only the two push handles 74 have user interfaces 34 as shown, for example, in FIG. 2, and the siderail user interfaces are dispensed with. In still other embodiments, only one push handle 74 has a user interface 34, such as, for example, the right push handle 74. In such apparatuses, it is especially useful to give a caregiver access to the user interface controls 100 from the head end 52 of the apparatus, as well as from the sides 56, 58 of the apparatus, without providing siderail user interface controls.

Figures 4, 5:
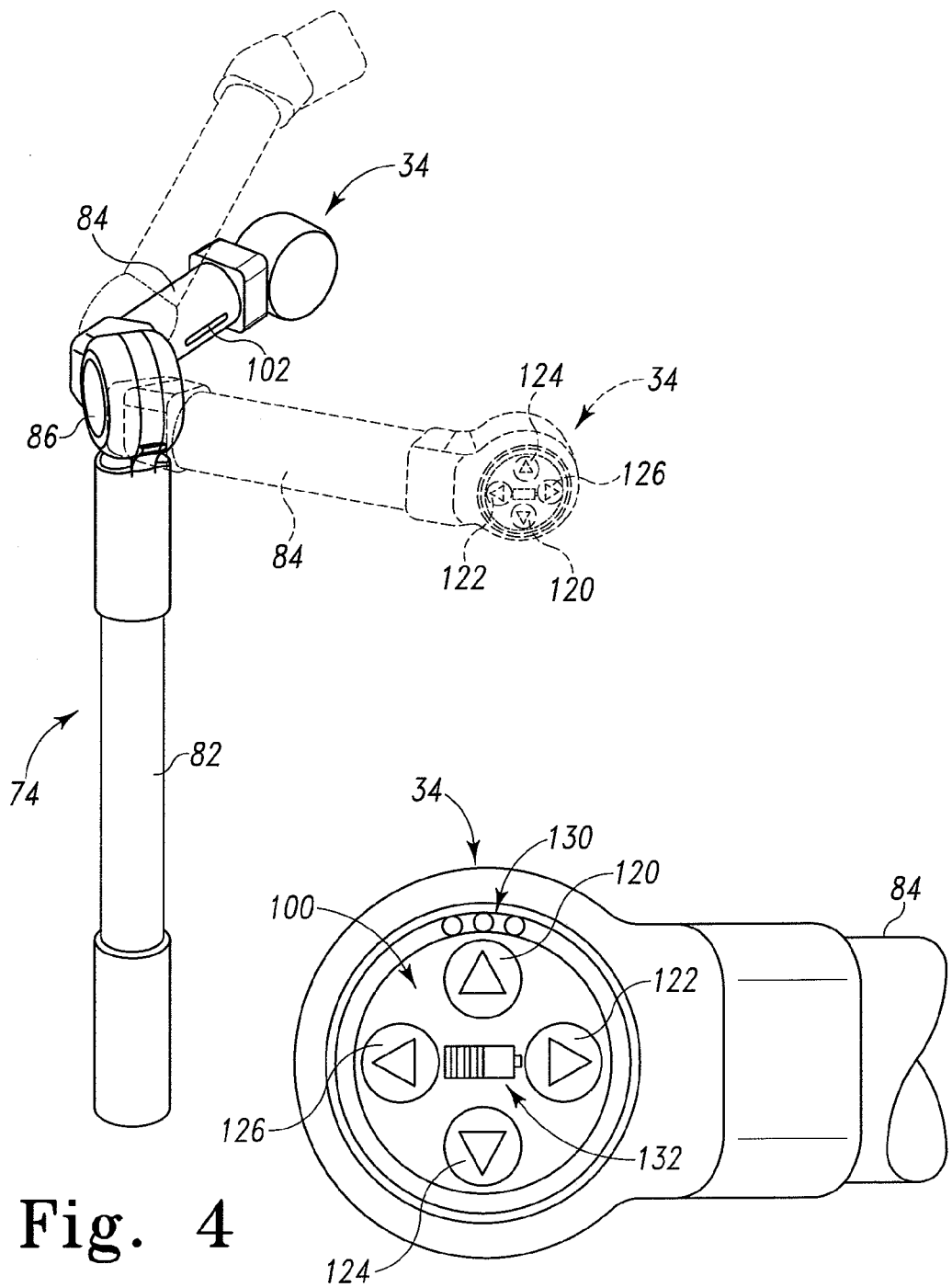
FIG. 4 is a perspective view of the right push handle showing in solid lines the handle post in the first position in which the associated user interface is presented to a caregiver standing at the head end of the frame as shown in FIG. 1 and showing in phantom lines the handle post moving to the second position in which the associated user interface is presented to a caregiver standing alongside the right side of the frame as shown in FIG. 7.
FIG. 5 is an enlarged front plan view of the user interface coupled to the right push handle showing the user interface having a speed selection button beneath three horizontally arranged speed indicator LED's near the top of the user interface, a move left button and a move right button beneath the speed selection button, battery power indicator LED's between the move left and move right buttons, and an inactive button near the bottom of the user interface.
Figure 12:
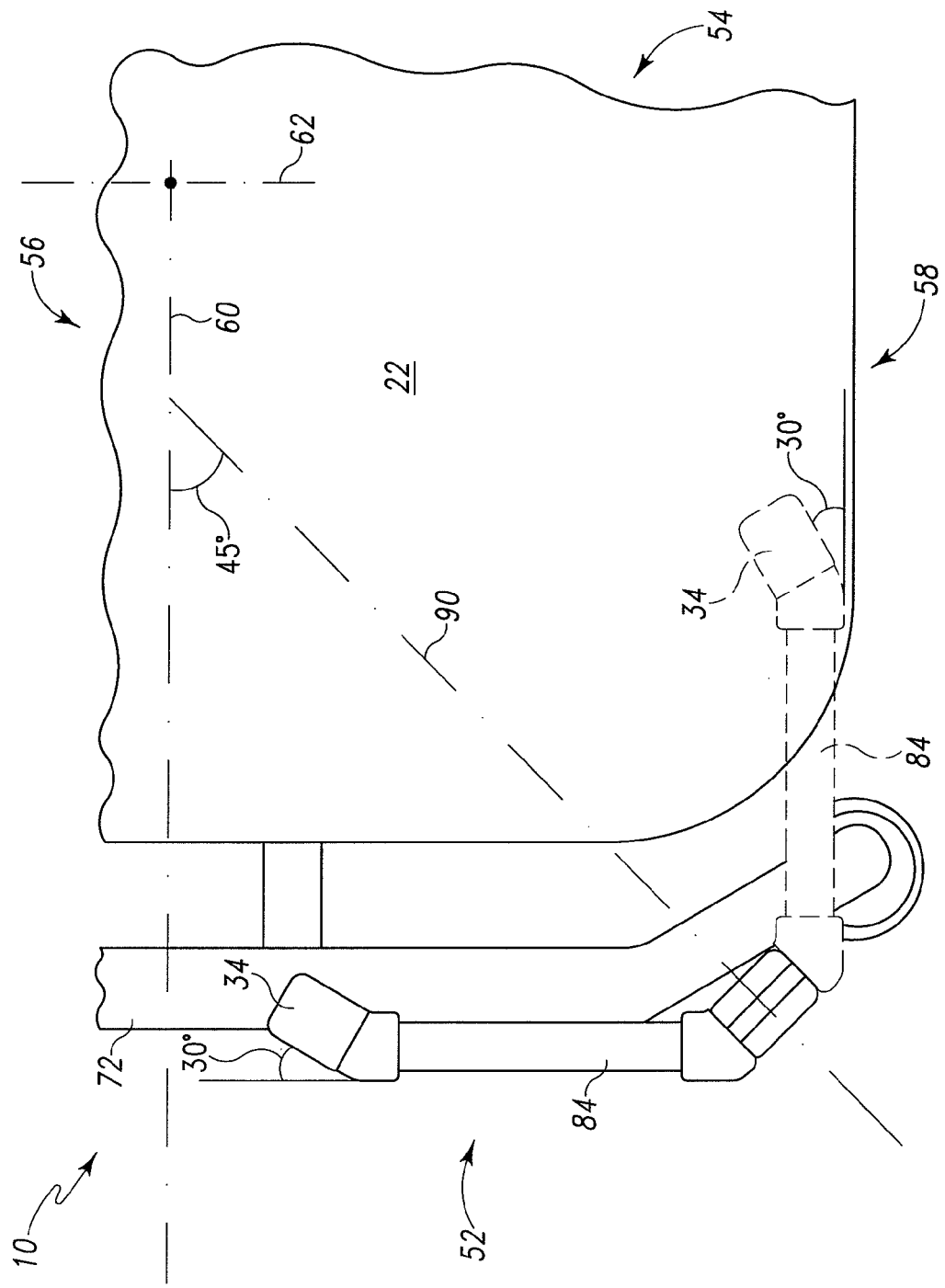
FIG. 12 is an enlarged plan view showing in solid lines the right handle post in the first position in which the associated user interface is presented to a caregiver standing at the head end of the frame and showing in phantom lines the right handle post in the second position in which the associated user interface is presented to a caregiver standing alongside the right side of the frame.

The two push handles 74 are substantially mirror images of each other. Thus, the description that follows of the right push handle 74 is applicable to both. As shown in FIG. 4, the push handle 74 has a portion 82 that extends generally upwardly from the mounting frame 70 (FIG. 1) and a handle post 84 is coupled to the upwardly-extending portion 82 by a rotary joint or hinge 86 for pivoting movement about a pivot pin 88 that defines an axis 90 that extends generally at 45° to the longitudinal axis 60 of the apparatus 10 as shown in FIG. 12.

As shown in FIG. 4, a proximal end 92 (FIG. 13) of the handle post 84 carries the user interface 34 and a distal end 94 (FIG. 13) of the handle post 84 is pivotally coupled the upwardly-extending portion 82 of the push handle 74. The user interface 34 moves with the handle post 84 between a first position, shown in FIG. 1, in which the user interface 34 is presented to a caregiver standing at a head end 52 of the apparatus 10 and a second position, shown in FIG. 7, in which the user interface 34 is presented to a caregiver standing alongside an associated side of the apparatus 10.

Figure 13:
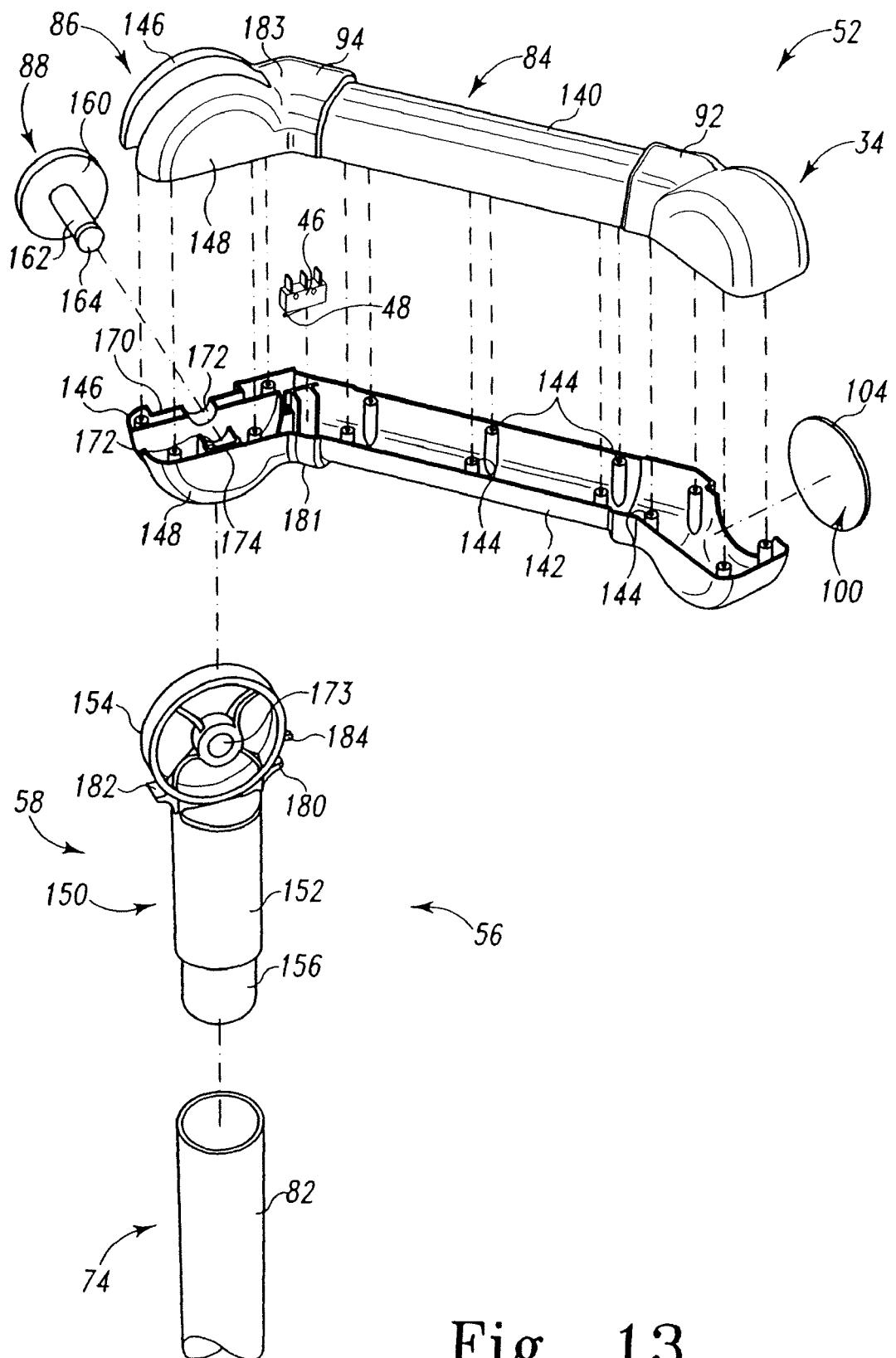
FIG. 13 is an exploded perspective view showing a 45° offset hinge coupling the handle post to an upwardly-extending hollow tube of the push handle and showing a handle post position indicative switch configured to be situated within an interior region of the hinge.

As shown in FIG. 13, in the illustrated embodiment, the upwardly extending portion 82 is a hollow steel tube and the handle post 84 is a hollow injection molded ABS plastic or glass-filled nylon part. The handle post 84 comprises top and bottom halves 140, 142 which are fastened together by suitable fasteners, such as screws. In the illustrated embodiment, the two halves 140, 142 are mirror images of each other. Screws (not shown) extend through relatively large openings 144 in the bottom half 142 of the handle post 84 and are then screwed into corresponding threaded openings in the top half 140 to secure the two halves 140, 142 together.

As shown in FIG. 13, the top and bottom halves 140, 142 of the handle post 84 cooperate to form a pair of parallel spaced-apart flanges 146, 148 near the distal end 94 of the handle post 84. A fitting 150 is mounted to the hollow tube 82. The fitting 150 has a hollow cylindrical portion 152 and an upper flattened portion 154. The hollow cylindrical portion 152 has a lower reduced diameter portion 156 that is fixedly inserted into the hollow tube 82 of the push handle 74. The upper flattened portion 154 of the fitting 150 is disposed between the spaced-apart flanges 146, 148 of the handle post 84. As explained below, the pivot pin 88 extends through respective openings 170, 172, 174 in the flanges 146, 148 of the handle post 84 and a bore 173 in the flattened portion 154 of the fitting 150. In the illustrated embodiment, the fitting 150 and the pivot pin 88 are injection molded ABS plastic or glass-filled nylon parts.

The pivot pin 88 has a first large diameter portion 160, a second small diameter portion 162 and a third intermediate diameter portion 164. The outer and inner flanges 146, 148 cooperate to form a first large diameter bore 170 and a second small diameter bore 172 and a third intermediate diameter bore 174. The first large diameter portion 160 of the pivot pin 88 is received in the first large diameter bore 170 formed in the outer flange 146. The second small diameter portion 162 of the pivot pin 88 is received in the second small diameter bore 172 formed in the outer and inner flanges 146, 148 and the small diameter bore 173 formed in the flattened portion 154 of the fitting 150. The third intermediate diameter portion 164 of the pivot pin 160 is received in the third intermediate diameter bore 174 formed in the inner flange 148. Receipt of the intermediate diameter portion 164 in the intermediate diameter bore 174 in the inner flange 146 helps to retain the pin 88 in place when the top and bottom halves 140, 142 of the handle post 84 are secured together.

Figures 9, 10:
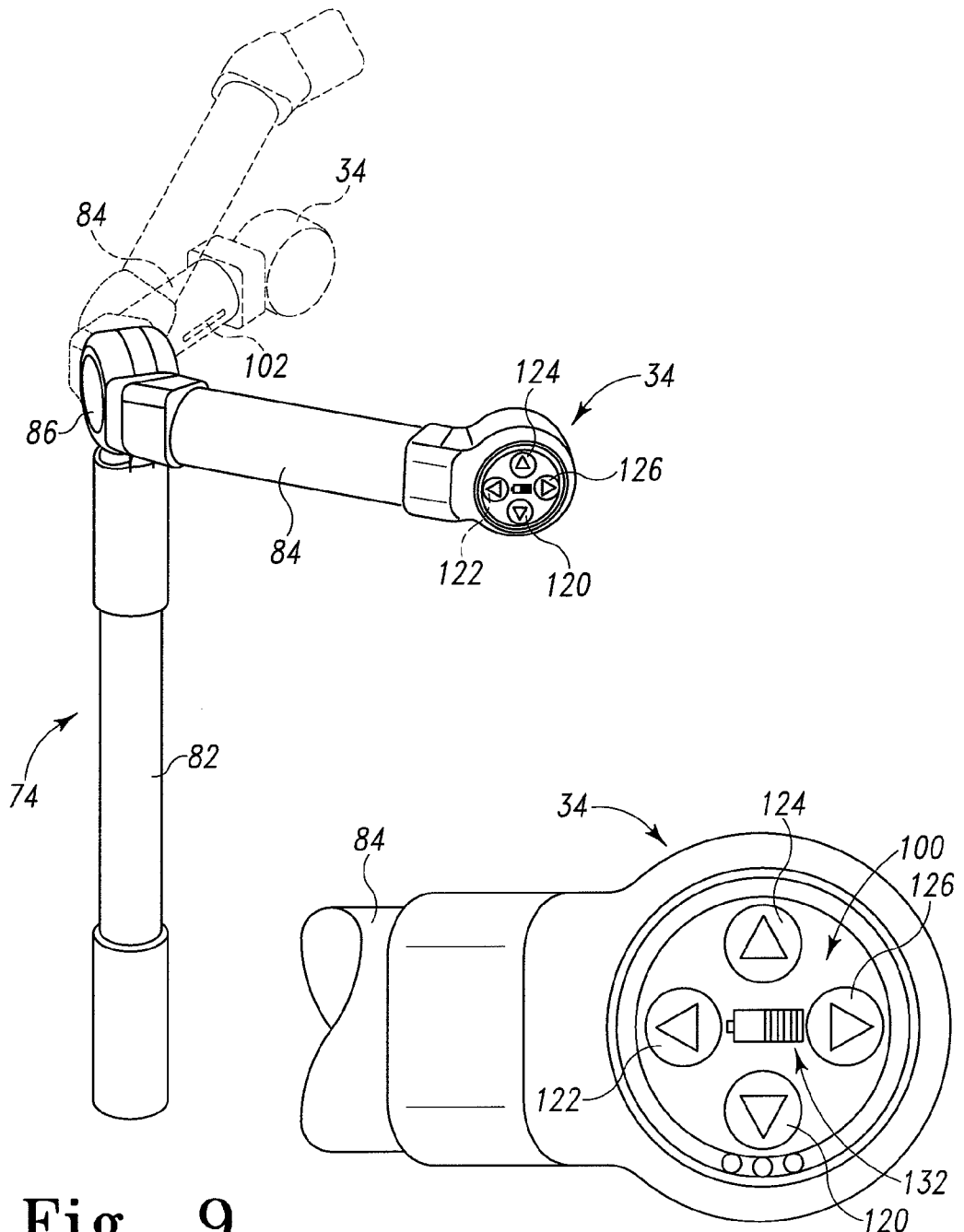
FIG. 9 is a perspective view of the right push handle showing in solid lines the handle post in the second position in which the associated user interface is presented to a caregiver standing alongside the right side of the frame and showing in phantom lines the handle post moving to the first position in which the associated user interface is presented to a caregiver standing at the head end of the frame (as shown in FIG. 1)
FIG. 10 is an enlarged front plan view of the user interface coupled to the right push handle showing the user interface having a move left button near the top of the user interface, a reverse button and a forward button beneath the move left button, battery power indicator LED's between the reverse and forward buttons, and a move right button near the bottom of the user interface above the unlit speed indicator LED's.
Figure 11:
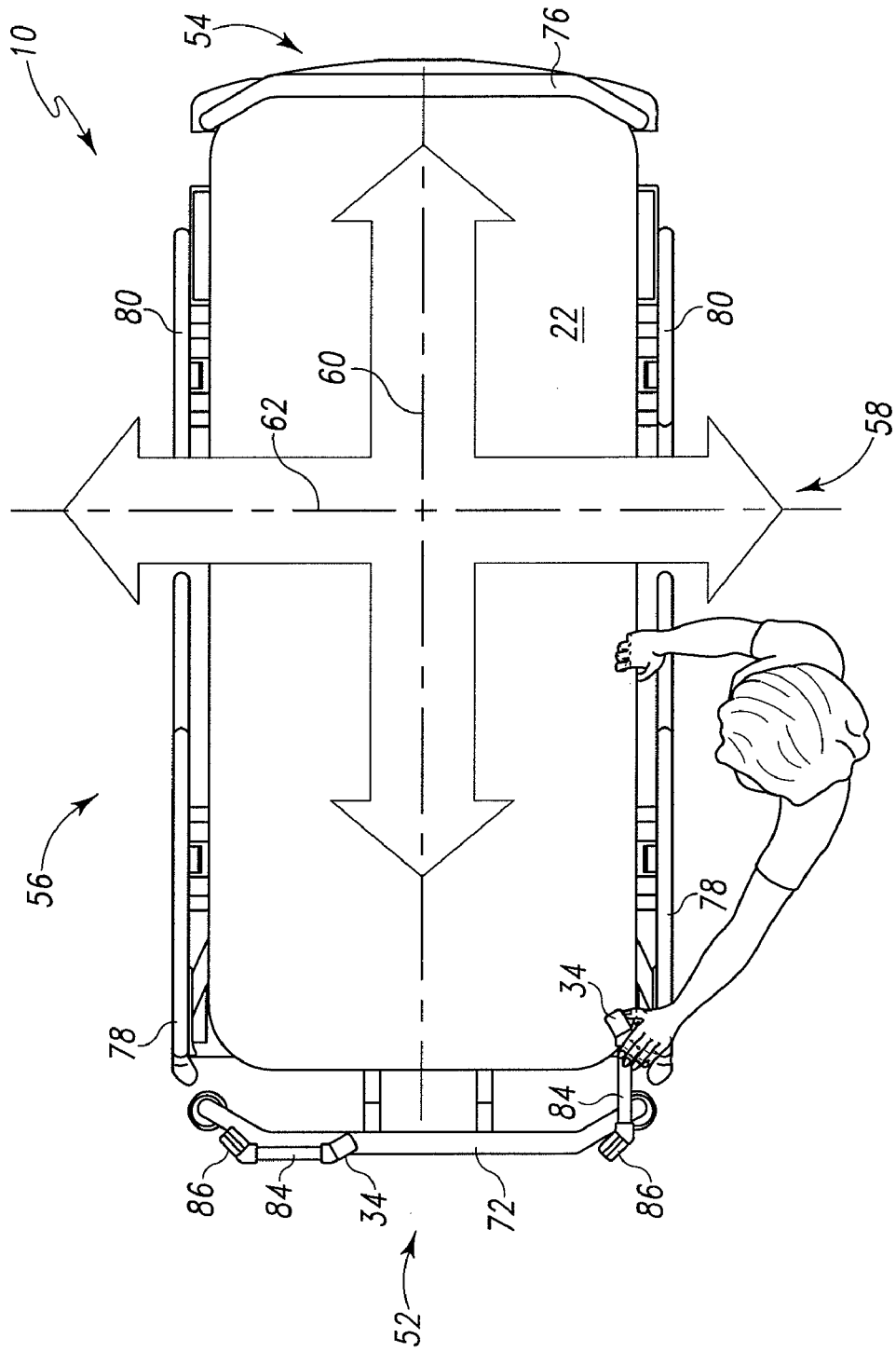
FIG. 11 is a plan view of the patient support apparatus showing the left handle post in the first position and the right handle post in the second position, and showing a caregiver standing alongside the right side of the patient support apparatus with her left hand on the right handle post so that she can operate the controls on the associated user interface with her thumb.

As shown in FIG. 13, the fitting 150 has first and second rotational stops 180, 182 that correspond to the first and second positions of the handle post 84, shown, for example, in FIGS. 4 and 9, respectively. In the first position of the handle post 84, a bottom portion 181 of the handle post 84 engages the first stop 180. In the second position of the handle post 84, a top portion 183 of the handle post 84 engages the second stop 180. In the illustrated embodiment, the pivot pin 88, the flanges 146, 148 of the handle post 84, and the fitting 150 coupled to the hollow tube 82 of the push handle 74 cooperate to form the 45° offset hinge 86. In some embodiments, however, the hinge 86 is replaced with an adjustable locking hub to provide positive locking at the first and second positions of the handle post 84, shown in solid lines in FIGS. 4 and 9, respectively. Such adjustable locking hubs are marketed, for example, by Carr Lane Manufacturing co., of St. Louis, Mo.

As shown in FIG. 4, each handle post 84 has an enable switch 102 (sometimes referred to as a dead man's switch) that extends outwardly toward the foot end 54 from a back side of the handle post 84. The term "back side" is determined from the vantage point of a user standing adjacent the head end 52 of apparatus 10 and facing toward the apparatus 10 as shown in FIG. 1. To operate the transport system 24, a user must press one of the two enable switches 102 on the associated handle posts 84 while simultaneously pressing one of the switches or controls 100 on the user interface 34 or, in some cases, as will be further described below, while simultaneously pushing or pulling one or both handle posts 84. If all other necessary conditions are met, as determined by the controller 30, then the controller 30 will apply power to the actuators 38, 40 and to the motor 42 to rotate the wheel 26 to propel the apparatus 10 forwardly, rearwardly, leftwardly, or righwardly, as the case may be. As indicated above, the terms "forwardly," "rearwardly," "leftwardly," and "righwardly" are from the vantage point of a caregive standing at the head end 52 of the apparatus 10 and facing toward the apparatus 10.

Figure 7:
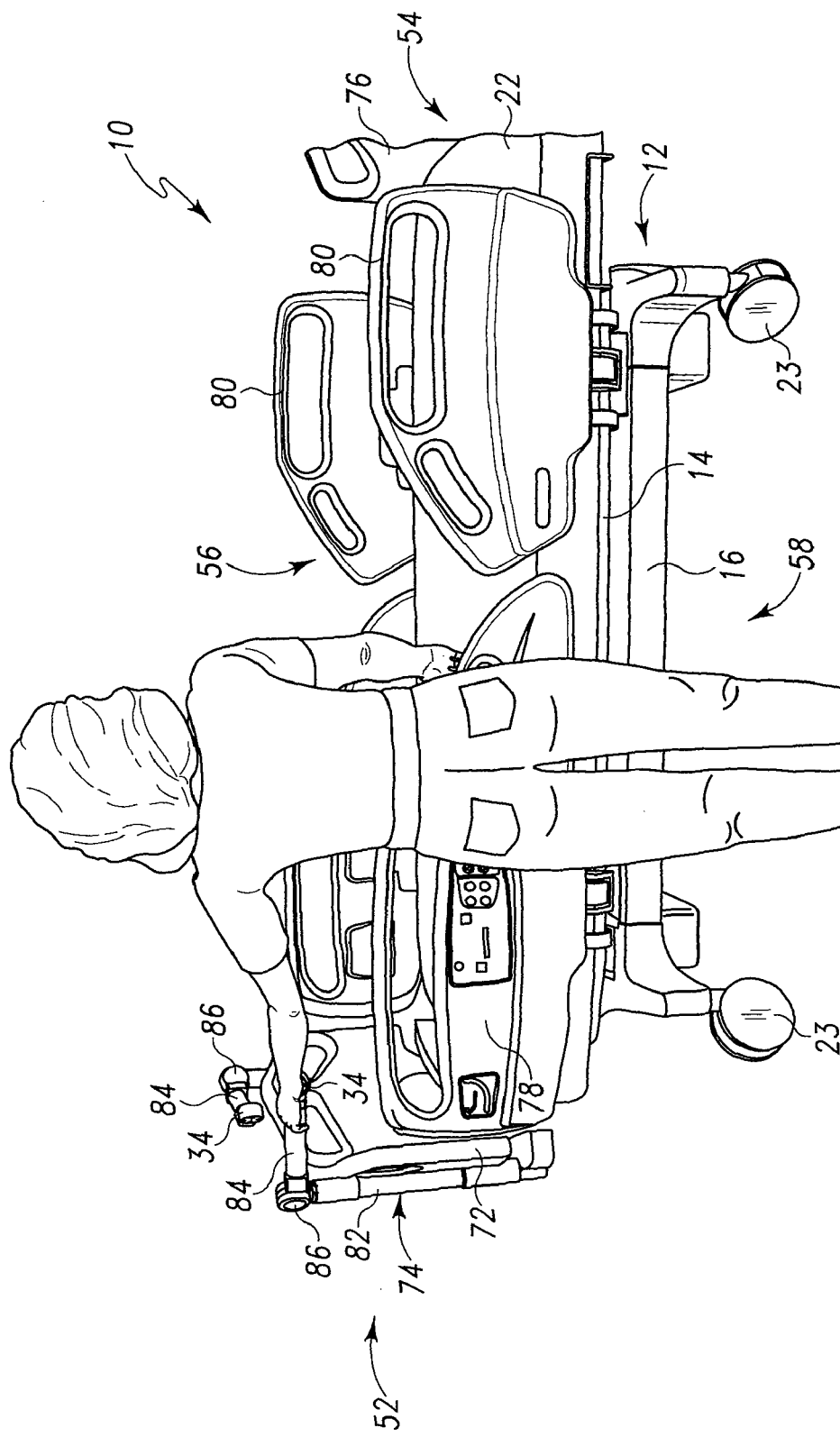
FIG. 7 is a right perspective view of the patient support apparatus showing the left handle post in the first position and the right handle post in the second position, and showing a caregiver standing alongside the right side of the patient support apparatus with her left hand on the right handle post so that she can operate the controls on the associated user interface with her thumb.
Figure 8:
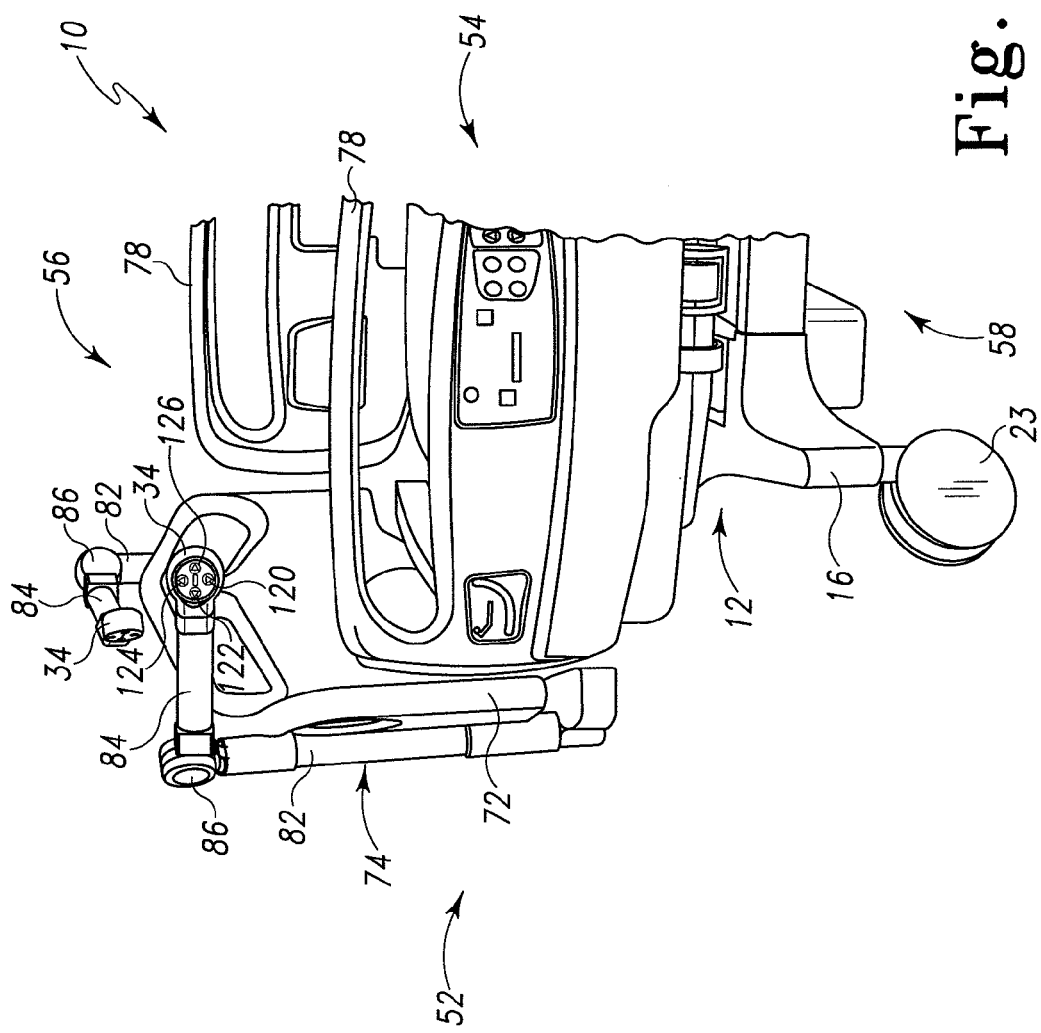
FIG. 8 is a right perspective view of the patient support apparatus showing the right handle post in the second position in which the associated user interface is presented to a caregiver standing alongside the right side of the frame as shown in FIG. 7.

The handle post 84 is pivotable between a first position, shown in solid lines in FIG. 4, in which the associated user interface 34 is presented to a caregiver standing at the head end 52 of the apparatus 10, as shown, for example, in FIG. 1 with respect to both handle posts 84, and a second position, shown, for example, in FIG. 9, in which the associated user interface is presented to a caregiver standing alongside an associated side of the apparatus 10, as shown, for example, in FIG. 7 with respect to the right handle post 84. In the illustrative embodiment, in the first position, the handle post 84 extends generally parallel to the lateral axis 62 of the apparatus 10 and a user interface overlay 104 (FIG. 13) of the user interface 34 lies in a plane that extends generally at 30° to the lateral axis 62 as shown in FIG. 12. In the illustrative embodiment, in the second position, the handle post 84 extends generally parallel to the longitudinal axis 60 of the apparatus 10 and the user interface overlay 104 of the user interface 34 lies in a plane that extends generally at 30° to the longitudinal axis 60 as shown in phantom lines in FIG. 12. The user interface overlay 104 carries indicia on the outwardly-facing surface thereof as shown in FIGS. 4 and 9. In the illustrative embodiment, the membrane switches 100 are positioned adjacent the inwardly-facing surface of the overlay 104.

In some embodiments, when the handle post 84 is in the first position, the transport system 24 is in the transport mode. The transport mode is useful for transporting a patient relatively long distances at relatively higher speeds, such as when a patient is transported from a patient room to an X-ray lab on another floor or in another wing of a hospital or healthcare facility. In some embodiments, when the handle post 84 is in the second position, the transport system 24 is in the adjustment mode. The adjustment mode is useful for making minor adjustments in the positioning of the apparatus 10 within its location at relatively lower speeds. The adjustment mode is especially useful when obese or morbidly obese (also known as, bariatric) patients are supported on the apparatus 10.

As shown in FIG. 3, the apparatus 10 includes a handle post position indicative switch 46 coupled to the controller 30. As shown in FIG. 13, in the illustrative embodiment, the handle post position indicative switch 46 is situated within an interior region of the handle post 84 and is coupled thereto. The fitting 150 has a stop 184 that is engaged by an actuator 48 of the switch 46 when the handle post 84 is in the first position as shown, for example, in FIG. 4. The actuator 48 disengages from the stop 184 when the handle post 84 moves to the second position as shown, for example, in FIG. 9. When the handle post 84 is in the first position, the switch 46 provides a first signal to the controller 30. When the handle post 84 is in the second position, the switch 46 provide a second signal to the controller 30. In some embodiments, the first and second signals signal the controller 30 to operate the transport system 24 in the transport mode and the adjustment mode, respectively. In the illustrative embodiment, the switch 46 is a cherry switch.

In the illustrative embodiment, each push handle 74 includes a strain gage assembly (not shown) having a load cell. The load cell comprises four strain gauges or resistors (not shown), which are electrically connected to form a Wheatstone bridge. Two of the resistors forming the load cell are located on an inner sidewall of a mounting tube of the load cell and are referred to herein as inner resistors. Two of the resistors forming the load cell are located on an outer sidewall of the mounting tube and are referred to herein as outer resistors. The inner and outer resisters forming the load cell are longitudinally aligned relative to the apparatus 10. The inner and outer directions are determined from the vantage point of a user standing adjacent the head end 52 of apparatus 10 and facing toward the apparatus 10. The mounting tube of the load cell is, in turn, attached to the mounting frame 70 of the apparatus 10 via a mounting bracket. A load cell of this type is disclosed in U.S. Pat. No. 7,090,041, which is hereby entirely incorporated by reference herein.

When the handle post 84 is in the first position (i.e., the system 24 is in the transport mode) and the handle post 84 is pushed forwardly, the inner resistors forming the load cell are compressed and the outer resistors forming the load cell are stretched to send a first input signal to the controller 30 (FIG. 3). On the other hand, when the handle post 84 is in the first position (i.e., the system 24 is in the transport mode) and the handle post 84 is pulled rearwardly, the inner resistors forming the load cell are stretched and the outer resistors forming the load cell are compressed to send a second input signal to the controller 30 (FIG. 3). The push handle 74 carrying the handle post 84 returns to a neutral position when the user lets go of push handle 74.

To propel the apparatus 10 in a forward direction (i.e., having the foot end 54 of the apparatus 10 leading the way) in the transport mode, a user must press at least one of the two enable switches 102 on the handle posts 84 of the push handles 74 while simultaneously applying sufficient pushing force to at least one of the handle posts 84 to send a first input signal to the controller 30. If all other necessary conditions are met, as determined by the controller 30, then the controller 30 will apply power to the motor 42 to rotate the wheel 26 in a first direction to propel the apparatus 10 forwardly.

To propel the apparatus 10 in a rearward direction (i.e., having the head end of the apparatus 10 leading the way) in the transport mode, a user must press at least one of the two enable switches 102 on the handle posts 84 of the push handles 74 while simultaneously applying sufficient pulling force to at least one of handle posts 84 to send a second input signal to the controller 30. If all other necessary conditions are met, as determined by the controller 30, then the controller 30 will apply power to the motor 42 to rotate the wheel 26 in a second direction, opposite the first direction, to propel the apparatus 10 rearwardly.

As indicated above, the user interfaces 34 include user inputs or controls 100 that are engaged by a user or caregiver to signal the controller 30 as to the manner in which transport system 24 is to be operated. In the illustrative embodiment, the two user interfaces 34 are substantially mirror images of each other. Thus, the description that follows of the user interface 34 coupled to the right push handle 74 is applicable to both. In the illustrative embodiment, the user interface 34 has four arrow buttons 120, 122, 124 and 126 as shown, for example, in FIG. 5. By locating the enable switch 102 on the handle post 84 and by locating the user interface 34 adjacent the distal end 94 of the handle post 84, a user is able to grasp the handle post 84 with his or her fingers and engage the enable switch 102 while also using his or her thumb to engage one of the switches or buttons 120, 122, 124, and 126 (collectively referred to as the user inputs or controls 100) as desired as shown, for example, in FIGS. 1 and 7.

In the illustrative embodiment, the buttons 120, 122, 124 and 126 comprises membrane switches, such as the type marketed by Xymox Technologies, Inc. of Milwaukee, Wis. However, it is within the scope of this disclosure for other types of buttons or switches to be used, such as rocker switches, toggle switches, push button switches, and so on, as well as using a touchscreen or other type of touch sensor, in lieu of the membrane switches that embody the buttons 120, 122, 124 and 126 in the illustrative example.

As will be further described below, the four arrow buttons 120, 122, 124, and 126 have a first plurality of functions when the handle post 84 is in the first position as shown in FIGS. 1-2 and 4-6 and a second plurality of functions when the handle post 84 is in the second position as shown in FIGS. 7-11. When the handle post 84 is in the first position, the first button 120 is a speed selection button, the second button 122 is a move right button, the third button 124 is an inactive button, and the fourth button 126 is a move left button as shown in FIG. 5. In addition, the user interface 34 has three horizontally arranged speed indicator LED's 130 near the top of the user interface 34 above the speed selection button 120. Also, the user interface 34 has battery power indicator LED's 132 between the move right and move left buttons 122, 126.

Successive presses of the speed selection button 120 selectively toggles among a plurality of discrete speed settings at which the motor 42 is operable. In the illustrative embodiment, the speed selection button 120 comprises a membrane switch or a pair of membrane switches, one for toggling the speed up and one for toggling the speed down. In the illustrative example, the plurality of discrete speed settings includes a slow speed setting, a medium speed setting, and a fast speed setting. As such, the user interface 34 shown in FIG. 5 has three speed indicator LED's 130 to visually indicate the selected speed setting. For example, in the slow speed setting, the left-most LED 130 is on or lit and the other two LED's 130 are off or unlit; in the medium speed setting the left-most LED 130 and the middle LED 130 are on and the right-most LED 130 is off; and in the high speed setting, all three LED's 130 are on. Of course, if there are more or less then three speed settings, a corresponding number of lesser or greater LED's 130 are provided on the associated user interface 34. In some embodiments, however, the user interface 34 includes a numeric display to visually indicate the selected speed setting.

As indicated above, to propel the apparatus 10 in a forward direction (i.e., having the foot end 54 of the apparatus 10 leading the way) while the handle post 84 is in the first position (FIGS. 1-2 and 4-6), a user must press at least one of the two enable switches 102 on the handle posts 84 while simultaneously applying sufficient pushing force to at least one of the handle posts 84. To propel the apparatus 10 in a rearward direction (i.e., having the head end of the apparatus 10 leading the way) while the handle post 84 is in the first position (FIGS. 1-2 and 4-6), a user must press at least one of the two enable switches 102 on the handle posts 84 while simultaneously applying sufficient pulling force to at least one of handle posts 84. If all other necessary conditions are met, as determined by the controller 30, then the controller 30 will apply power to the motor 42 to propel the apparatus 10 forwardly or rearwardly, as the case may be.

With regard to the move forward/move reverse operation of the transport system 24 in some embodiments, at least one of the slow speed setting, the medium speed setting, and the fast speed setting results in the apparatus 10 being propelled faster in the forward direction than the corresponding speed setting results in the apparatus 10 being propelled in the reverse direction. In such embodiments, therefore, the controller 30 signals the drive motor 42 to operate more slowly for a particular speed setting in the reverse direction than in the forward direction. In other embodiments, the slow, medium, and fast speed settings may have substantially the same respective speeds in the forward and reverse directions. It will be appreciated that each of the plurality of discrete speed settings corresponds to a threshold speed up to which the motor 42 is accelerated to reach over time. The acceleration profile may be of any geometry, such as a linear ramp, discrete steps, curved, or combinations thereof.

With regard to the move left/move right operation of the transport system 24 while the handle post 84 is in the first position (FIGS. 1-2 and 4-6), assuming all of the other necessary conditions are met, including pressing one of the enable switches 102, then pressing the move right button 122 results in the apparatus 10 being propelled by transport system 24 laterally in the right direction, whereas pressing the move left button 126 results in the apparatus 10 being propelled by the transport system 24 laterally in the left direction. As indicated above, the left and right directions are determined from the vantage point of a user standing adjacent a head end of the apparatus 10 and facing toward the apparatus 10 or from the vantage point of a patient lying in a supine or face up position on the mattress 22 with his head near the head end 52 of the apparatus 10.

If the wheel 26 is in the first longitudinal orientation when one of the move right and move left buttons 122, 126 is pressed simultaneously with engaging the enable switch 102, then the controller 30 will command the swivel actuator 40 to move the wheel 26 from the first longitudinal orientation to the second lateral orientation prior to commanding the motor 42 to rotate the wheel 26 to propel the apparatus 10 leftward or rightward as the case may be. Similarly, if the wheel 26 is in the second lateral orientation when one or both handle posts 84 are pushed forwardly or pulled rearwardly simultaneously with engaging the enable switch 102, then the controller 30 will command the swivel actuator 40 to move the wheel 26 from the second lateral orientation to the first longitudinal orientation prior to commanding the motor 42 to rotate the wheel 26 to propel the apparatus 10 forwardly or rearwardly, as the case may be.

In some embodiments, when the handle post 84 is in the first position (FIGS. 1-2 and 4-6), the speed setting in the left and right directions automatically defaults to the low speed setting regardless of what speed setting is otherwise selected using the speed selection button 120 for the forward and reverse directions. In some embodiments, when the handle post 84 is in the second position (FIGS. 7-11), the speed setting in the forward, reverse, left and right directions automatically defaults to the low speed setting regardless of what speed setting is otherwise selected using the speed selection button 120 for the forward and reverse directions when the handle post 84 is in the first position (FIGS. 1-2 and 4-6). Of course, having slow, medium, and fast settings for the left and right directions are contemplated by this disclosure.

As indicated above, the four arrow buttons 120, 122, 124, and 126 have a first plurality of functions when the handle post 84 is in the first position as shown in FIGS. 1-2 and 4-6 and a second plurality of functions when the handle post 84 is in the second position as shown in FIGS. 7-11. When the handle post 84 moves from the first position shown in FIG. 5 to the second position shown in FIG. 10, the first arrow button 120 moves from a position at the top of the user interface 34 (FIG. 5) to a position at the bottom of the user interface 34 (FIG. 10), the second arrow button 122 moves from a position on the right side of the user interface 34 (FIG. 5) to a position on the left side of the user interface 34 (FIG. 10), the third arrow button 124 moves from a position at the bottom of the user interface 34 (FIG. 5) to a position at the top of the user interface 34 (FIG. 10), and the fourth arrow button 126 moves from a position on the left side of the user interface 34 (FIG. 5) to a position on the right side of the user interface 34 (FIG. 10).

When the handle post 84 is in the second position, as shown in FIG. 10, 1) the first button 120, which was a speed selection button in FIG. 5, is now a move right button in FIG. 10, 2) the second button 122, which was a move right button in FIG. 5, is now a move reverse button in FIG. 10, 3) the third button 124, which was an inactive button in FIG. 5, is now a move left button in FIG. 10, and 4) the fourth button 126, which was a move left button in FIG. 5, is now a move forward button in FIG. 10.

With regard to the move forward/move reverse operation of the transport system 24 while the handle post 84 is in the second position (FIGS. 7-11), assuming all of the other necessary conditions are met, including pressing one of the enable switches 102, then pressing the move forward button 126 results in the apparatus 10 being propelled by the transport system 24 longitudinally in the forward direction, whereas pressing the move reverse button 122 results in the apparatus 10 being propelled by the transport system 24 longitudinally in the reverse direction.

With regard to the move left/move right operation of the transport system 24 while the handle post 84 is in the second position (FIGS. 7-11), assuming all of the other necessary conditions are met, including pressing one of the enable switches 102, then pressing the move right button 120 results in the apparatus 10 being propelled by transport system 24 laterally in the right direction, whereas pressing the move left button 124 results in the apparatus 10 being propelled by the transport system 24 laterally in the left direction.

The battery power indicator LED's 132 are lit from left to right to indicate the amount of charge in the battery of the power supply 36. When all the LED's 118 are lit, the battery is fully charged and when no LED's 118 are lit, the battery is essentially drained of charge. In some embodiments, however, the user interface 34 includes a numeric display to visually indicate the amount of charge in the battery of the power supply 36.

In some embodiments, when the handle post 84 is in the second position as shown in FIGS. 7-11, the controller 30 defaults to the slow speed setting for all directions, i. e., forward, reverse, left and right, regardless of what speed setting may have otherwise been selected with the speed selection button 120 when the handle post 84 is in the first position as shown in FIGS. 1-2 and 4-6. However, in other embodiments, when the handle post 84 is in the second position as shown in FIGS. 7-11, the controller 30 may default to the medium speed setting for the forward and reverse directions and the low speed setting for the left and right directions regardless of what speed setting may have otherwise been selected with the speed selection button 120 when the handle post 84 is in the first position as shown in FIGS. 1-2 and 4-6.

As shown in FIG. 13, in the illustrative embodiment, both the handle post 84 and upwardly-extending portion 82 of the push handle 74 are hollow. The wires (not shown) from the push handle user interface controls 100, which are membrane switches in the illustrative embodiment, and from the push handle position indicative switch 46 are routed from the respective controls 100 and the switch 46 through an interior region of the handle post 84, through an interior region of the hinge 86, and then downwardly through an interior region of the upwardly-extending portion 82 of the push handle 74. The wires exit through an opening in the bottom portion of the push handle 74 and are then routed to the controller 30 (FIG. 3).

Although certain illustrative embodiments have been described in detail above, variations and modifications exist within the scope and spirit of this disclosure as described and as defined in the following claims.

The invention claimed is:

1. A patient support apparatus comprising:
 a frame;
 a push handle coupled to the frame and having a handle post rotatable about an axis that extends generally at 45° to a longitudinal axis of the frame;
 a power transport system coupled to the frame and operable to propel the patient support apparatus along a floor; and
 at least one user input coupled to the handle post and engageable to provide a signal to the power transport system to propel the patient support apparatus along the floor, the handle post being rotatable about the axis between a first position presenting the at least one user input at an end of the frame and a second position presenting the at least one user input alongside an associated side of the frame.

2. The apparatus of claim 1, wherein the first position of the handle post is generally parallel to said end of the frame and the second position of the handle post is generally parallel to said side of the frame.

3. The apparatus of claim 1, wherein the push handle has a portion that extends generally upwardly from the frame and the handle post is coupled to the upwardly-extending portion by a hinge.

4. The apparatus of claim 3, wherein the hinge comprises a 450 offset hinge.

5. The apparatus of claim 1, wherein, when the handle post is in the first position, the power transport system is in a transport mode and, when the handle post is in the second position, the power transport system is in an adjustment mode, and wherein a speed at which the power transport system propels the patient support apparatus in the transport mode is higher than a corresponding speed at which the power transport system propels the patient support apparatus in the adjustment mode.

6. The apparatus of claim 5, wherein, when the power transport system is in the transport mode, the at least one user input is assigned a first function and, when the power transport system is in the adjustment mode, the at least one user input is assigned a second function.

7. The apparatus of claim 1, further comprising an enable switch coupled to the handle post, wherein the at least one user input and the enable switch are engageable simultaneously to signal the power transport system to propel the patient support apparatus along the floor.

8. The apparatus of claim 1, further comprising a controller to control operation of the power transport system, wherein the power transport system has a wheel and an on-board battery, and wherein, before the power transport system propels the patient support apparatus, the controller must have been signaled that the wheel is lowered to engage the floor and that the on-board battery is sufficiently charged.

9. The apparatus of claim 8, further comprising a handle post position indicative switch coupled to the controller, wherein, when the handle post is in the first position, the handle post position indicative switch signals the controller to operate the power transport system in a transport mode and, when the handle post is in the second position, the handle post position indicative switch signals the controller to operate the power transport system in an adjustment mode.

10. The apparatus of claim 9, wherein the handle post position indicative switch is coupled to the push handle.

11. The apparatus of claim 1, wherein the at least one user input comprises a membrane switch.

12. The apparatus of claim 1, wherein the power transport system has a wheel that is movable between a first orientation in which the power transport system is operable to propel the patient support apparatus substantially parallel to a longitudinal dimension of the frame and a second orientation in which the power transport system is operable to propel the patient support apparatus substantially parallel to a lateral dimension of the frame.

13. The apparatus of claim 12, wherein the push handle is pushed forwardly and pulled rearwardly to signal the power transport system to propel the patient support apparatus forwardly and rearwardly, respectively.

14. The apparatus of claim 12, wherein the at least one user input comprises a speed selection button that is engageable to select a speed at which the power transport system propels the patient support apparatus.

15. The apparatus of claim 12, wherein the at least one user input comprises left and right switches that are engageable to signal the power transport system to propel the patient support apparatus leftwardly and rightwardly, respectively.

16. A patient support apparatus comprising:
 a frame;
 a patient support coupled to the frame;
 a push handle coupled to the frame and having a handle post rotatable about an axis that extends generally at 45° to a longitudinal axis of the frame;
 a wheel coupled to the frame;
 a power transport system coupled to the frame and operable to rotate the wheel to propel the patient support apparatus along a floor; and
 at least one user input coupled to the handle post and engageable to signal the power transport system to propel the patient support apparatus along the floor, the handle post being movable between a first position where the at least one user input has a first function and a second position where the at least one user input has a second function.

17. The apparatus of claim 16, wherein the at least one user input is presented at said end of the frame when the handle post is in the first position and the at least one user input is presented alongside said side of the frame when the handle post is in the second position.

18. A patient support apparatus comprising:

a frame;

a patient support coupled to the frame;

a push handle coupled to the frame, the push handle having a handle post which is grippable by a user to maneuver the patient support apparatus along a floor and rotatable about an axis that extends generally at 45° to a longitudinal axis of the frame;

a plurality of casters coupled to the frame;

a wheel coupled to the frame;

a motor coupled to the wheel and operable to rotate the wheel to propel the patient support apparatus along the floor; and an electrical system comprising a controller to control operation of the motor, the controller being configured to signal operation of the motor to rotate the wheel to propel the patient support apparatus along the floor, the electrical system further comprising a plurality of user inputs coupled to the handle post which are engageable to signal the controller to operate the motor, the handle post being movable between a first position generally parallel to an end of the frame and a second position generally parallel to a side of the frame.

19. The apparatus of claim 18, wherein, when the handle post is in the first position, the plurality of user inputs are presented adjacent said end of the frame, and wherein, when the handle post is in the second position, the plurality of user inputs are presented alongside said side of the frame.

20. A patient support apparatus comprising:

a frame;

a patient support coupled to the frame;

a push handle coupled to the frame and having a handle post rotatable about an axis that extends generally at 45° to a longitudinal axis of the frame; and at least one user input coupled to the handle post, the handle post being movable between a first position presenting the at least one user input at an end of the frame and a second position presenting the at least one user input alongside the frame.

* * * * *